(12) United States Patent
Kang et al.

(10) Patent No.: US 7,817,253 B2
(45) Date of Patent: Oct. 19, 2010

(54) DISTANCE MEASUREMENT METHOD, MEDIUM, AND APPARATUS FOR MEASURING DISTANCE BETWEEN THE DISTANCE MEASUREMENT APPARATUS AND TARGET OBJECT

(75) Inventors: Byong-min Kang, Yongin-si (KR); Kee-chang Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 189 days.

(21) Appl. No.: 12/213,870

(22) Filed: Jun. 25, 2008

(65) Prior Publication Data
US 2009/0066931 A1    Mar. 12, 2009

(30) Foreign Application Priority Data
Sep. 7, 2007    (KR) ............... 10-2007-0091192

(51) Int. Cl.
*G01C 3/08* (2006.01)
(52) U.S. Cl. .................... 356/5.07; 356/5.08
(58) Field of Classification Search ............. 356/5.01, 356/5.07, 5.08
See application file for complete search history.

(56) References Cited

U.S. PATENT DOCUMENTS

| 3,325,750 | A | | 6/1967 | O'Hern et al. |
| 4,699,508 | A | * | 10/1987 | Bolkow et al. ............. 356/5.07 |
| 5,619,317 | A | * | 4/1997 | Oishi et al. ................ 356/5.05 |
| 5,963,308 | A | | 10/1999 | Takasaki et al. |
| 6,535,275 | B2 | * | 3/2003 | McCaffrey et al. ......... 356/5.08 |
| 7,088,433 | B1 | * | 8/2006 | Kato ......................... 356/5.01 |
| 2006/0192086 | A1 | | 8/2006 | Niclass et al. |
| 2007/0252974 | A1 | * | 11/2007 | Dimsdale ................... 356/5.01 |

FOREIGN PATENT DOCUMENTS

WO    98/18061    4/1998

OTHER PUBLICATIONS

European Search Report dated Dec. 23, 2008.
Robert Lange et al., "Solid-State Time-of-Flight Range Camera", IEEE Journal of Quantum Electronics, vol. 37, No. 3, Mar. 2001.

* cited by examiner

*Primary Examiner*—Isam Alsomiri
(74) *Attorney, Agent, or Firm*—Staas & Halsey LLP

(57) ABSTRACT

A distance measurement method, medium, and apparatus for measuring a distance between the distance measurement apparatus and a target object are provided. The distance measurement method comprises counting pulses of a clock pulse signal having a low frequency during a period from when an optical pulse signal is applied to a target object by a distance measurement apparatus to when the optical pulse signal reflected from the target object is received by the distance measurement apparatus, counting pulses of the clock pulse signal during a period from when the optical pulse signal is received by the distance measurement apparatus to when the received optical pulse signal and the clock pulse signal correspond to each other, and calculating a distance between the distance measurement apparatus and the target object using the counting results. Accordingly, the distance can be measured with high accuracy using the optical pulse signal and the clock pulse signal, thereby reducing costs and power consumption.

12 Claims, 10 Drawing Sheets

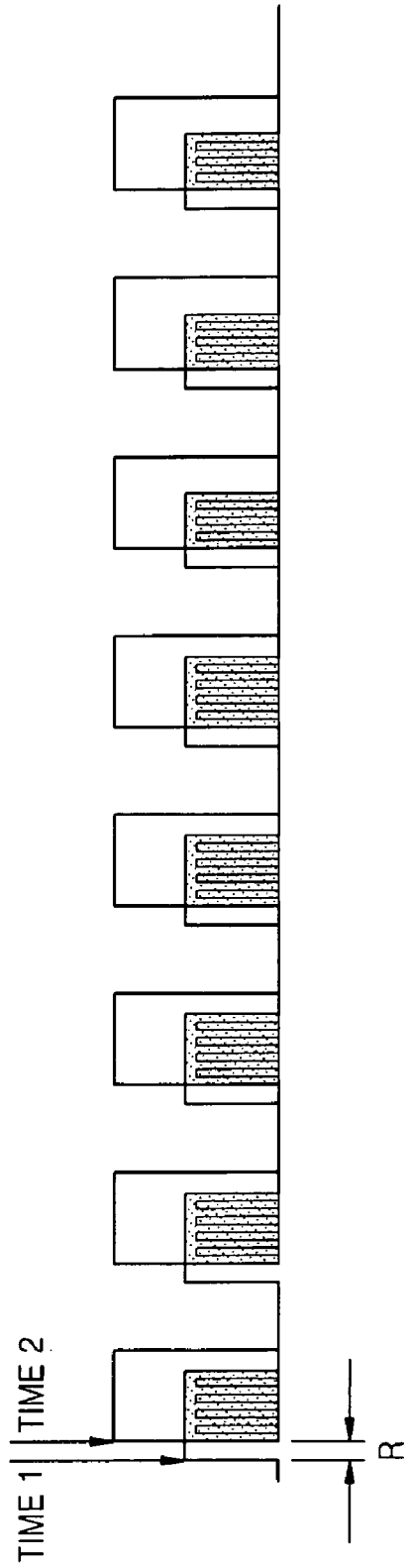
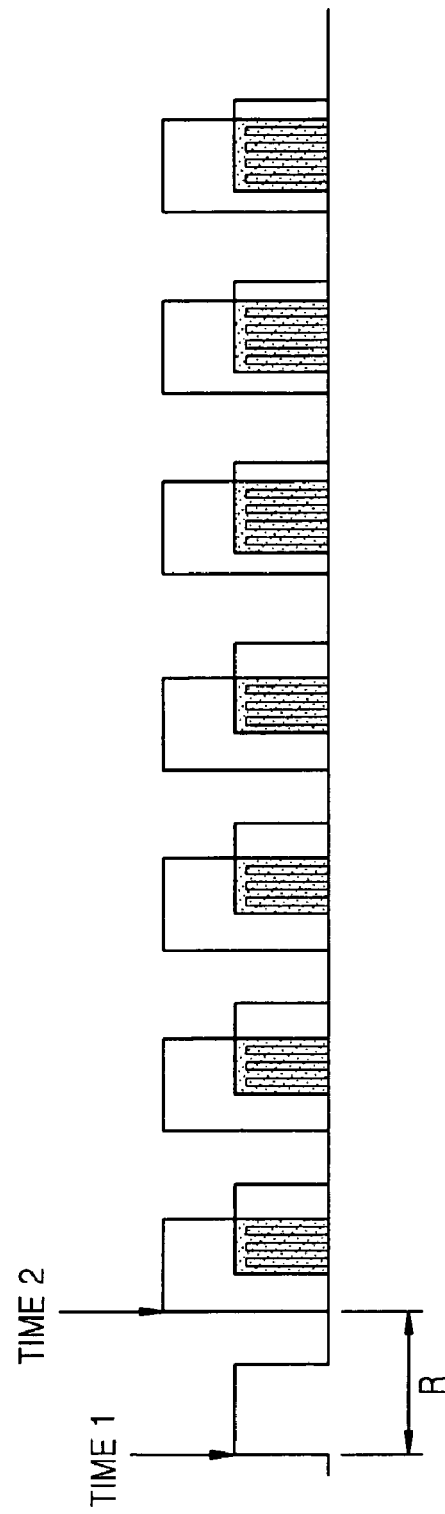

DISTANCE MEASUREMENT METHOD, MEDIUM, AND APPARATUS FOR MEASURING DISTANCE BETWEEN THE DISTANCE MEASUREMENT APPARATUS AND TARGET OBJECT

CROSS-REFERENCE TO RELATED APPLICATIONS

This application claims the priority benefit of Korean Patent Application No. 10-2007-0091192, filed on Sep. 7, 2007, in the Korean Intellectual Property Office, the disclosure of which is incorporated herein in its entirety by reference.

BACKGROUND

1. Field

One or more embodiments of the present invention relate to a distance measurement method, medium, and apparatus and, more particularly, to a distance measurement method, medium, and apparatus for applying light to a target object and measuring a distance between the distance measurement apparatus and the target object using a round trip time including the time it takes for the light to be irradiated to the target object and then reflected from the target object.

2. Description of the Related Art

To measure a distance between a distance measurement apparatus and a target object, a method of irradiating light to the target object, measuring a round trip time including the time it takes for the light to be irradiated to the target object and then reflected from the target object, and calculating the distance between the distance measurement apparatus and the target object using the round trip time is generally used. In this case, the distance is calculated by dividing the round trip time by 2 to obtain an arrival time required for the light to arrive at the target object and multiplying the arrival time by the velocity of light. Here, the velocity of light is a constant, that is, $3 \times 10^8$ m/s, and thus it is very important to measure the round trip time with accuracy in order to calculate the correct distance.

The round trip time can be calculated using a phase difference between the light irradiated at the target object and the light reflected from the object, which is disclosed in an article entitled "Solid-State Time-of-Flight Range Camera" by Robert Lange and Peter Seits, appearing in IEEE Journal of quantum electronics, Vol. 37, No. 3, pp. 390-397, March 2001. However, this method of calculating a round trip time of light using the phase difference cannot measure a correct round trip time for an object located at a distance at which the phase difference is greater than 360° because the phase difference is repeated in the cycle of 360°.

According to U.S. Patent Application No. 2006-353229, a round trip time of light is measured using a time to digital converter (TDC), and thus a distance between a distance measurement apparatus and an object is not limited. The TDC counts pulses of a pulse signal during a period from when light is irradiated to the object to when the light is reflected from the object to measure the round trip time of the light. However, to measure a correct round trip time, a very short pulse width is required, and thus the pulse signal must have a very high frequency. For example, a pulse signal having a frequency of hundreds of GHz is required for accuracy of 1 mm. That is, a TDC using a high-frequency pulse signal is needed to increase the accuracy of distance measurement, and thus high power is required.

SUMMARY

One or more embodiments of the present invention provide a distance measurement method, medium, and apparatus for calculating a distance between the distance measurement apparatus and a target object with high accuracy using a clock pulse signal having a low frequency with no limitation on the distance between the distance measurement apparatus and the target object.

According to an aspect of the present invention, there is provided a distance measurement method comprising: counting pulses of a second pulse signal during a round trip time of a first pulse signal, from when the first pulse signal is applied to a target object by a distance measurement apparatus to when the first pulse signal reflected from the target object is received by the distance measurement apparatus; counting pulses of the second pulse signal during a period from when the first pulse signal is received by the distance measurement apparatus to when the received first pulse signal and the second pulse signal correspond to each other; and calculating a distance between the distance measurement apparatus and the target object using the counting results.

According to another aspect of the present invention, there is provided a computer readable recording medium storing a program for executing the distance measurement method.

According to another aspect of the present invention, there is provided a distance measurement apparatus comprising: a first counter to count pulses of a second pulse signal during a period from when a first pulse signal is applied to a target object by the distance measurement apparatus to when the first pulse signal reflected from the target object is received by the distance measurement apparatus; a second counter to count pulses of the second pulse signal during a period from when the first pulse signal is received by the distance measurement apparatus to when the received first pulse signal and the second pulse signal correspond to each other; and a distance calculator to calculate a distance between the distance measurement apparatus and the target object using the counting results of the first and second counters.

According to an aspect of the present invention, there is provided a distance measurement method which counts pulses of the clock pulse signal during the period from when the optical pulse signal is applied to the target object to when the optical pulse signal reflected from the target object is received to obtain the macroscopic time in the round trip time of the optical pulse signal, and counts pulses of the clock pulse signal during the period from when the optical pulse signal is received to when the optical pulse signal and the clock pulse signal correspond to each other to obtain the microscopic time in the round trip time of the optical pulse signal. Accordingly, the round trip time of the optical pulse signal can be correctly measured, and thus the distance between the distance measurement apparatus and the target object can be calculated with high accuracy using the clock pulse signal having a low frequency. This reduces costs and power consumption.

BRIEF DESCRIPTION OF THE DRAWINGS

These and/or other aspects, features, and advantages will become apparent and more readily appreciated from the following description of embodiments, taken in conjunction with the accompanying drawings of which:

FIGS. 8A and 8B respectively illustrate an optical pulse signal and a clock pulse signal when a counting result when a counting operation is stopped, $P_{ms}$, is greater than a half value and when $P_{ms}$ is smaller than the half value.

DETAILED DESCRIPTION OF EMBODIMENTS

Figure 1:
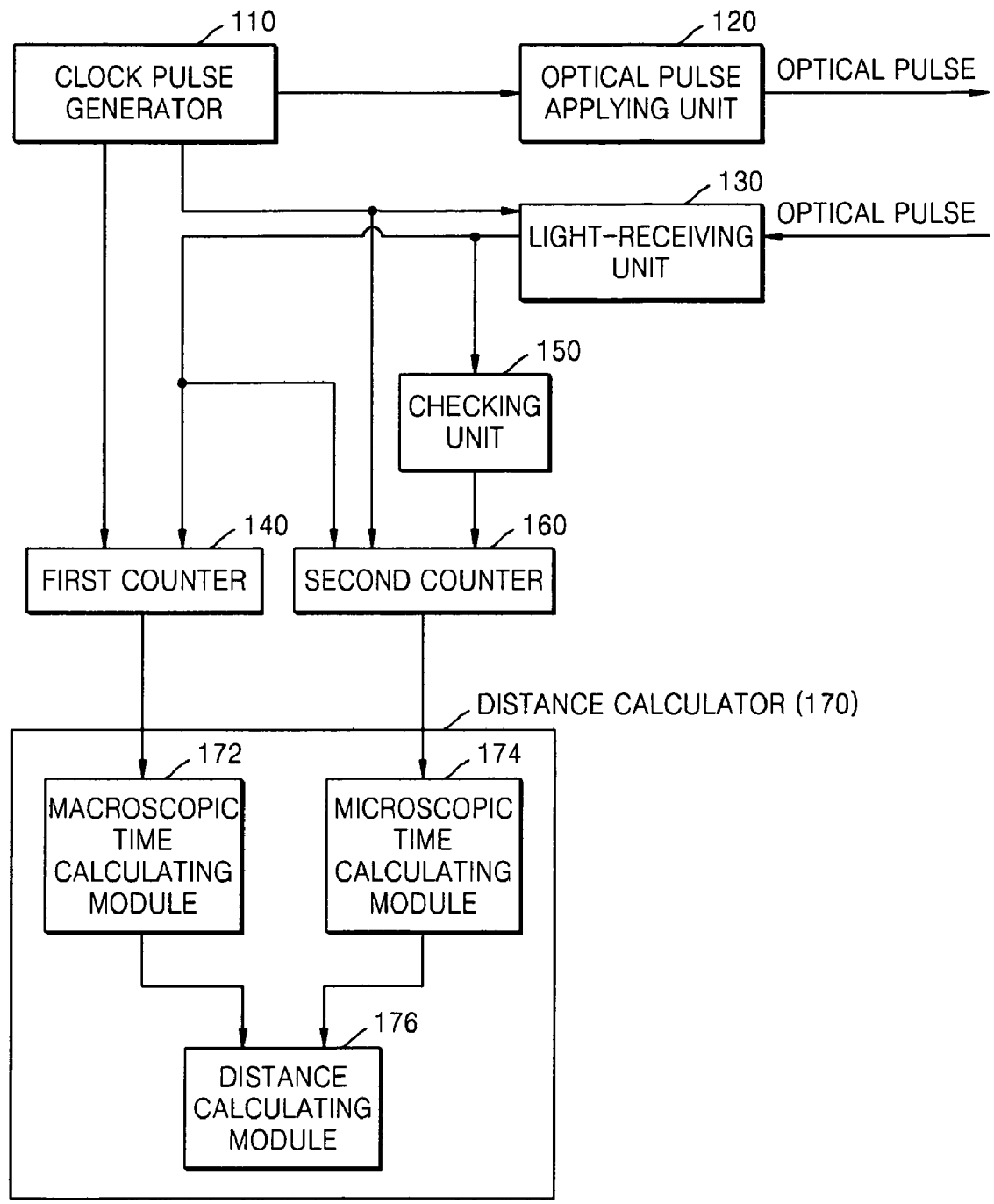
FIG. 1 is a block diagram of a distance measurement apparatus according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a distance measurement apparatus according to an embodiment of the present invention. Referring to FIG. 1, the distance measurement apparatus according to the current embodiment of the present invention includes a clock pulse generator 110, an optical pulse applying unit 120, a light-receiving unit 130, a first counter 140, a checking unit 150, a second counter 160, and a distance calculator 170. The distance calculator 170 includes a macroscopic time calculating module 172, a microscopic time calculating module 174, and a distance calculating module 176.

The clock pulse generator 110 generates a clock pulse signal having a predetermined frequency. Pulses of the clock pulse signal are counted by the first and second counters 140 and 160 and used to measure a round trip time of an optical pulse signal. The round trip time includes the time it takes for the optical pulse signal to be irradiated to a target object, reflected from the target object, and received by the light-receiving unit 130.

The optical pulse applying unit 120 applies an optical pulse signal having a predetermined frequency to the target object at a rising edge of the clock pulse signal generated by the clock pulse generator 110. Preferably, a difference between the frequency of the optical pulse signal and the frequency of the clock pulse signal generated by the clock pulse generator 110 is sufficiently smaller than the frequency of the clock pulse signal.

Figure 3A:
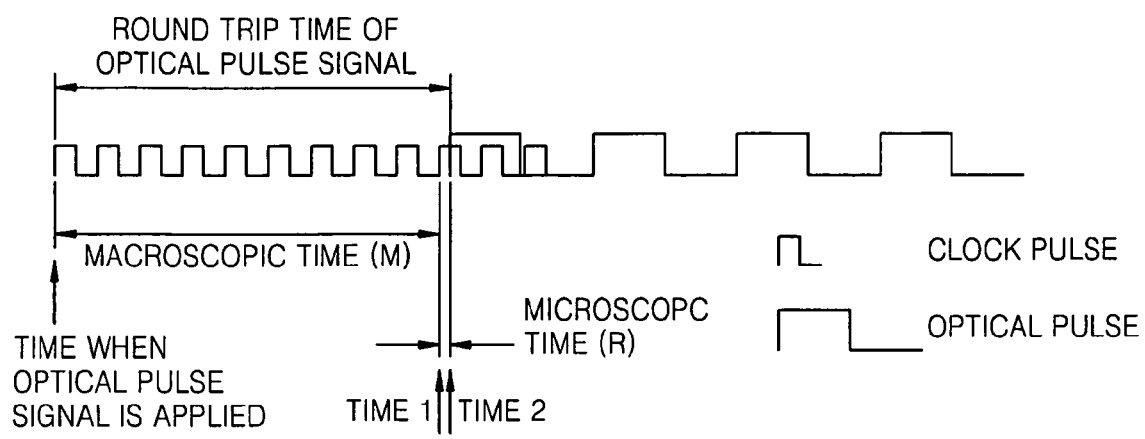
FIGS. 3A and 3B respectively illustrate an optical pulse signal and a clock pulse signal for explaining a method of calculating a macroscopic time and a microscopic time, according to an embodiment of the present invention.
Figure 3B:
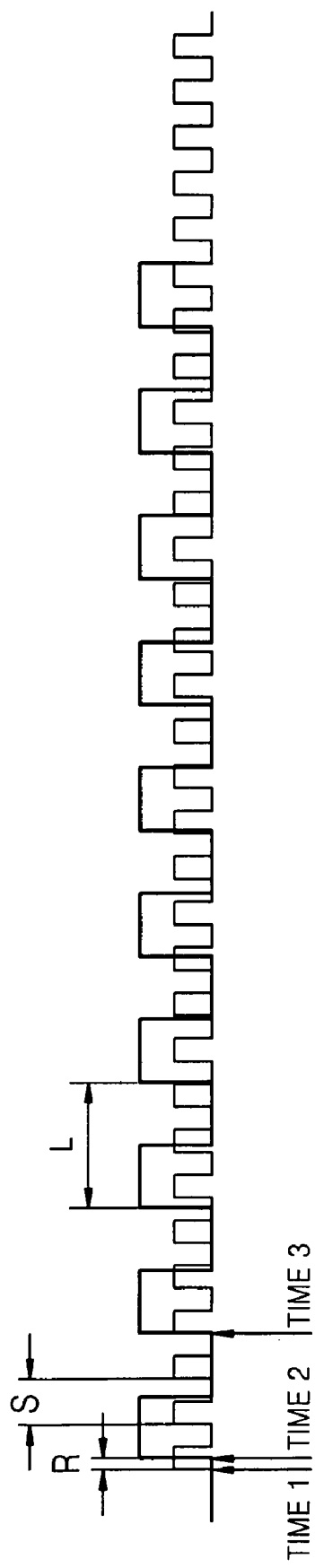

FIGS. 3A and 3B respectively illustrate the optical pulse signal and the clock pulse signal for explaining a method of calculating a macroscopic time and a microscopic time, according to an embodiment of the present invention. The light-receiving unit 130 receives the optical pulse signal applied by the optical pulse applying unit 120 and then reflected from the target object. Referring to FIG. 3A, the time when the optical pulse signal is received by the light-receiving unit 130 is referred to as a time 2 and the time corresponding to the rising edge of a pulse of the optical pulse signal right before the time 2 is referred to as a time 1.

The light-receiving unit 130 includes pixels that accumulate charges when receiving light. A gate or a switch is formed in each of the pixels such that the gate is opened to pass light when the clock pulse signal generated by the clock pulse generator 110 is high to accumulate charges in the pixels and the gate is closed to block the light when the clock pulse signal is low to prevent charges from being accumulated in the pixels.

The first counter 140 counts pulses of the clock pulse signal generated by the clock pulse generator 110 during a period from when the optical pulse applying unit 120 applies the optical pulse signal to when the light-receiving unit 130 receives the optical pulse signal. Here, the number of counted pulses is referred to as n.

The checking unit 150 checks whether the clock pulse signal generated by the clock pulse generator 110 corresponds to the optical pulse signal received by the light-receiving unit 130. The checking unit 150 can check whether the clock pulse signal and the optical pulse signal correspond to each other by determining whether a rising edge of the clock pulse signal and a rising edge of the optical pulse signal correspond to each other. Referring to FIG. 3B, the time when rising edges of the clock pulse signal and the optical pulse signal correspond to each other is referred to as a time 3.

Figure 2:
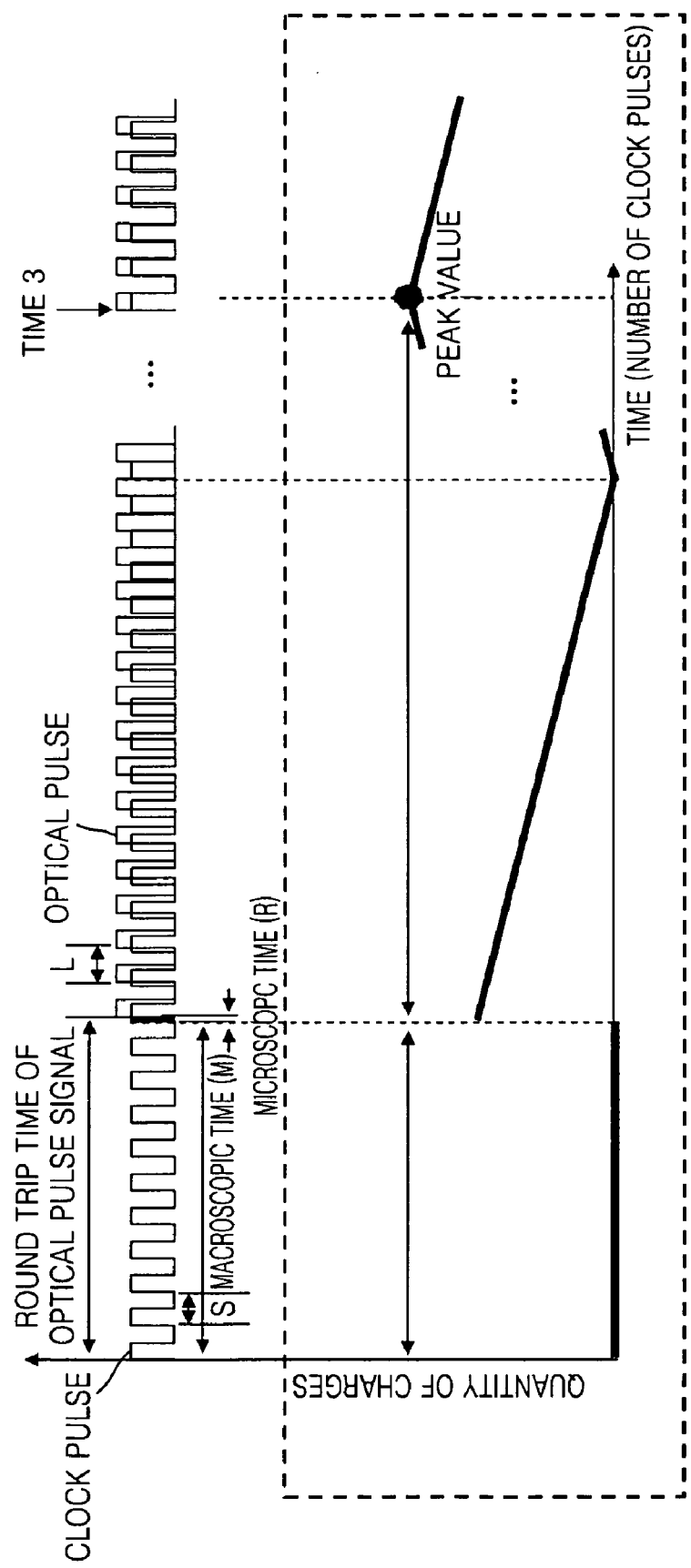
FIG. 2 illustrates a variation in the amount of charges accumulated in pixels of a light-receiving unit of the distance measurement apparatus illustrated in FIG. 1 over a period of time, according to an embodiment of the present invention.

FIG. 2 illustrates a variation in the amount of charges accumulated in pixels of the light-receiving unit 130 of the distance measurement apparatus illustrated in FIG. 1 over a period of time, according to an embodiment of the present invention. Referring to FIG. 2, the checking unit 150 checks the amount of charges accumulated in the light-receiving unit 130. Here, it can be considered that the time when the amount of charges accumulated in the light-receiving unit 130 reaches a peak value is the time when a rising edge of the clock pulse signal and a rising edge of the optical pulse signal correspond to each other. This is because the light-receiving unit 130 accumulates charges when both the clock pulse signal and the optical pulse signal are high, and thus the amount of accumulated charges reaches a peak value when a rising edge of the optical pulse signal and a rising edge of the clock pulse signal correspond to each other. To achieve this, it is preferable that a pulse duration time of the optical pulse signal is the same as a pulse duration time of the clock pulse signal.

The second counter 160 counts pulses of the clock pulse signal generated by the clock pulse generator 110 and pulses of the optical pulse signal received by the light-receiving unit 130 during a period from when the light-receiving unit 130 receives the optical pulse signal to when the clock pulse signal corresponds to the optical clock signal. Here, the number of counted pulses of the clock pulse signal is referred to as $n_s$ and the number of counted pulses of the optical pulse signal is referred to as $n_l$.

The distance calculator 170 calculates a round trip time of the optical pulse signal using the number of pulses of the clock pulse signal counted by the first counter 140 during the period from when the optical pulse applying unit 120 applies the optical pulse signal to when the light-receiving unit 130 receives the optical pulse signal, n, the number of pulses of the clock pulse signal during the period from when the light-receiving unit 130 receives the optical pulse signal to when the clock pulse signal corresponds to the optical clock signal, $n_s$, and the number of pulses of the optical pulse signal during the period from when the light-receiving unit 130 receives the optical pulse signal to when the clock pulse signal corresponds to the optical clock signal, $n_l$, counted by the second counter 160, multiplies the round trip time by the velocity of light and divides the multiplication result by 2 to obtain a distance D between the distance measurement apparatus and the target object. Referring to FIG. 3A, the round trip time of the optical pulse signal corresponds to a period from when the optical pulse signal is applied to the target object to the time 2.

In the prior art, only the number of pulses of the clock pulse signal is counted during a period from when the optical pulse signal is applied to the target object to the time 1 (illustrated in FIG. 3A) to calculate the round trip time of the optical pulse signal, and thus accuracy of calculation of the round trip time is decreased. Accordingly, a clock pulse signal having a very high frequency should be used in order to improve the accuracy. In the current embodiment of the present invention, however, a macroscopic time M corresponding to a period from when the optical pulse signal is applied to the target object to the time 1 and a microscopic time R corresponding to a period from the time 1 to the time 2 are calculated, and thus the round trip time of the optical pulse signal can be correctly calculated without increasing the frequency of the clock pulse signal.

The macroscopic time calculating module 172 calculates the macroscopic time M illustrated in FIG. 3A. Specifically, the macroscopic time calculating module 172 multiplies the number of pulses of the clock pulse signal counted by the first counter 140 during the period from when the optical pulse applying unit 120 applies the optical pulse signal to when the light-receiving unit 130 receives the optical pulse signal, n, by the cycle of the clock pulse signal, S, to obtain the macroscopic time M. That is, the macroscopic time calculating module 172 calculates the macroscopic time M using the equation M=n×S.

Then, the microscopic time calculating module 174 calculates the microscopic time R illustrated in FIG. 3A. Referring to FIG. 3B, the microscopic time R corresponds to a difference between a period from the time 1 to a time 3 at which a rising edge of the clock pulse signal and a rising edge of the optical pulse signal correspond to each other and a period from the time 2 to the time 3. The period from the time 1 to the time 3 equals the product of the number of pulses of the clock pulse signal during the period from when the light-receiving unit 130 receives the optical pulse signal to when the clock pulse signal corresponds to the optical clock signal, $n_s$, by the cycle of the clock pulse signal, S, and the period from the time 2 to the time 3 equals the product of the number of pulses of the optical pulse signal during the period from when the light-receiving unit 130 receives the optical pulse signal to when the clock pulse signal corresponds to the optical clock signal, $n_l$, by the cycle of the optical pulse signal, L. Accordingly, the microscopic time calculating module 174 calculates the microscopic time R using the equation R=($n_s$×S)−($n_l$×L).

The distance calculating module 176 adds up the macroscopic time M calculated by the macroscopic time calculating module 172 and the microscopic time R calculated by the microscopic time calculating module 174 to obtain the round trip time of the optical pulse signal, multiplies the round trip time by the velocity of light, c, and divides the multiplication result by 2 to calculate the distance D between the distance measurement apparatus and the target object. That is, the distance calculating module 176 calculates the distance between the distance measurement apparatus and the target object using the equation D=½×c×(M+R).

The distance measurement apparatus according to the current embodiment of the present invention can improve distance measurement accuracy. For example, when the frequency of the optical pulse signal is 1 MHz and the frequency of the clock pulse signal is 1.000001 MHz, the measurement accuracy when measuring the distance between the distance measurement apparatus and the target object is calculated according to ½×(the velocity of light)×(the period of the clock pulse signal) if only the clock pulse signal is used. That is, the distance accuracy corresponds to ½×(3×10$^8$)×1/(1.000,001)=150 m. However, the measurement accuracy of the distance calculated using both the clock pulse signal and the optical pulse signal can be improved as follows.

Figure 4:
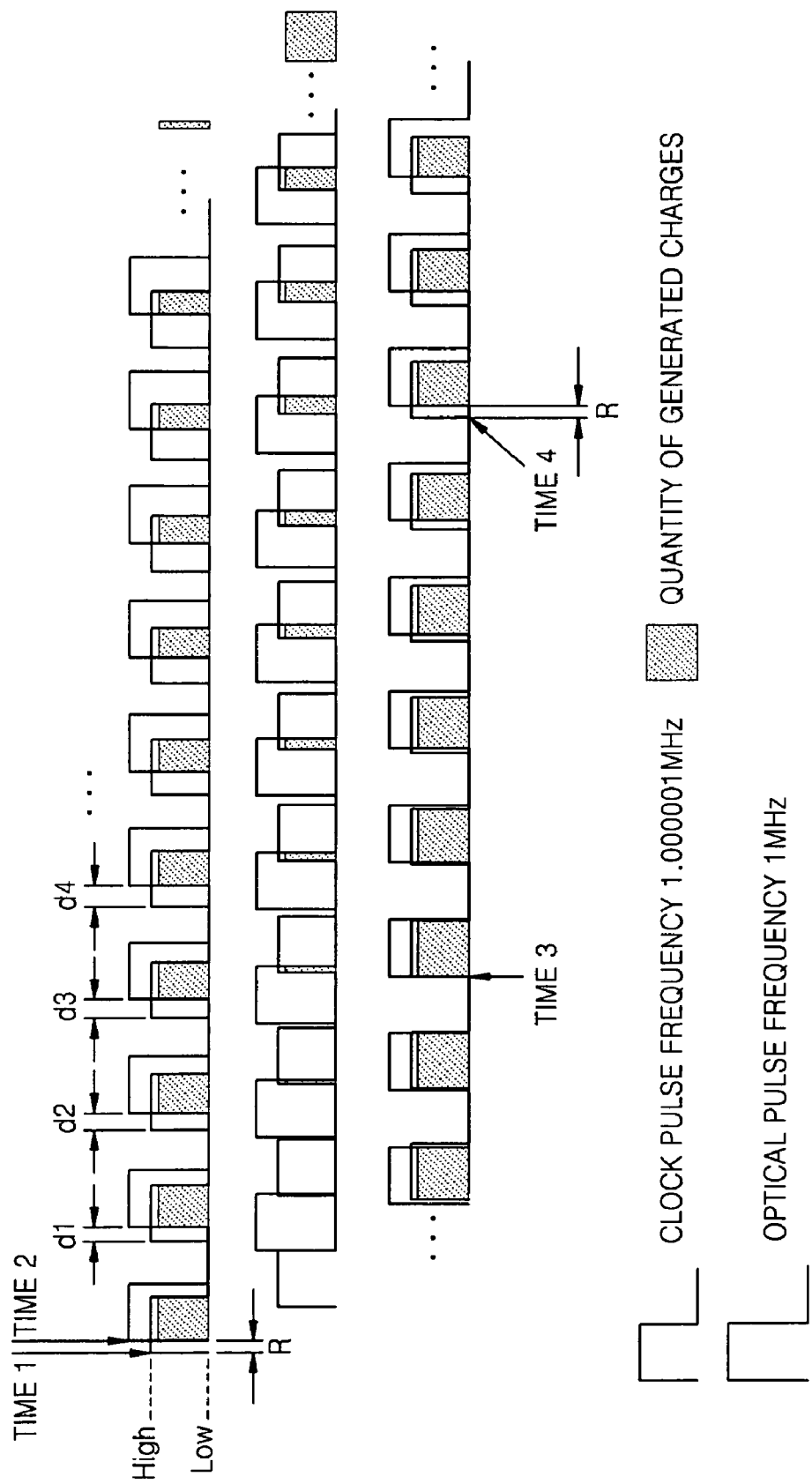
FIG. 4 is a diagram for explaining improvement of accuracy of distance measurement using the distance measurement apparatus illustrated in FIG. 1, according to an embodiment of the present invention.

FIG. 4 is a diagram for explaining improvement of accuracy of distance measurement using the distance measurement apparatus illustrated in FIG. 1, according to an embodiment of the present invention. Referring to FIG. 4, the time between pulses of the clock pulse signal and the optical pulse signal gradually increases, as shown by R, d1, d2 and d3, and then increases until one cycle of the clock pulse signal at the time 3. Then, the time between pulses of the clock pulse signal and the optical pulse signal gradually increases to correspond to the initial value R at a time 4. In this case, the number of pulses of the clock pulse signal is 1,000,001 and the number of pulses of the optical pulse signal is 1,000,000 in the period from the time 1 to the time 4. Accordingly, the period of a single clock pulse is exactly divided by 1,000,000 to provide an effective pulse signal having a period of (1/1000001)/1000000. That is, the measurement accuracy becomes 150 m/1,000,000=0.15 mm when the optical pulse signal and the clock pulse signal are used, and thus the accuracy is a million times better than the accuracy achieved when only the clock pulse signal is used. Here, the number of pulses of the optical pulse signal in the period from the time 1 to the time 4, such as 1,000,000 in this case, is referred to as a number of division.

Figure 5:
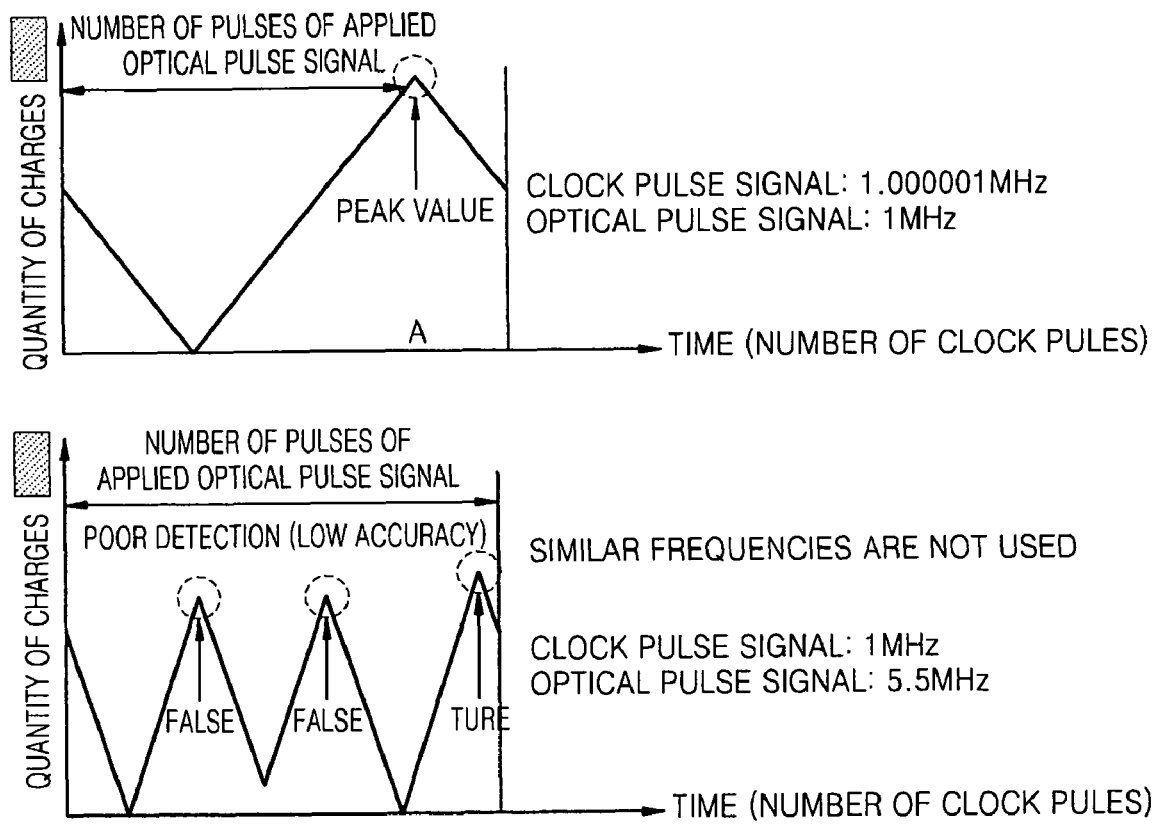
FIG. 5 includes diagram for explaining a time when the amount of charges accumulated in pixels reaches a peak value when a frequency difference between an optical pulse signal and a clock pulse signal is large and when the difference is small, respectively, according to an embodiment of the present invention.

FIG. 5 includes diagrams for explaining a time when the amount of charges accumulated in pixels reaches a peak value when a frequency difference between the optical pulse signal and the clock pulse signal is large and when the difference is small, respectively, according to an embodiment of the present invention.

It is preferable that the frequency of the optical pulse signal applied by the optical pulse applying unit 120 and the frequency of the clock pulse signal generated by the clock pulse generator 110 satisfy the following two conditions. Firstly, one of the frequency of the optical pulse signal and the frequency of the clock pulse signal must not correspond to an integer multiple of the other. It is required to detect the time 3 at which a rising edge of the clock pulse signal and a rising edge of the optical pulse signal correspond to each other in the current embodiment of the present invention. However, the time 3 cannot be detected if one of the frequency of the optical pulse signal and the frequency of the clock pulse signal corresponds to an integer multiple of the other.

Secondly, the difference between the frequency of the optical pulse signal and the frequency of the clock pulse signal must be sufficiently smaller than the frequency of the clock pulse signal. This is because it is difficult to detect the time 3 if the difference is not sufficiently small. For example, a time when the amount of charges accumulated in pixels becomes a peak value can be easily detected when the difference between the frequency of the optical pulse signal and the frequency of the clock pulse signal is sufficiently small, as illustrated in the first graph of FIG. 5. However, it is difficult to detect the time when the amount of charges accumulated in pixels becomes the peak value when the difference between the frequency of the optical pulse signal and the frequency of the clock pulse signal is large, as illustrated in the second graph of FIG. 5.

Furthermore, when the optical pulse signal has a frequency a bit lower than the frequency of the clock pulse signal is used, the number of pulses of the optical pulse signal during the period from when the light-receiving unit 130 receives the optical pulse signal to when the clock pulse signal corresponds to the optical clock signal, $n_l$, counted by the second counter 160 illustrated in FIG. 1 is smaller than the number of pulses of the clock pulse signal during the period from when the light-receiving unit 130 receives the optical pulse signal to when the clock pulse signal corresponds to the optical clock signal, $n_s$, by 1, and thus the microscopic time calculating module 174 can calculate the microscopic time R using $n_s-1$ instead of $n_l$ without additionally counting $n_l$. That is, the microscopic time calculating module 174 can calculate the microscopic time R using the equation $R=n_l \times S-(n_l-1) \times L$. Consequently, the distance calculating module 176 can calculate the distance D using the equation $D=\frac{1}{2} \times c \times [n \times S+\{n_s \times S-(n_l-1) \times L\}]$.

Figure 6:
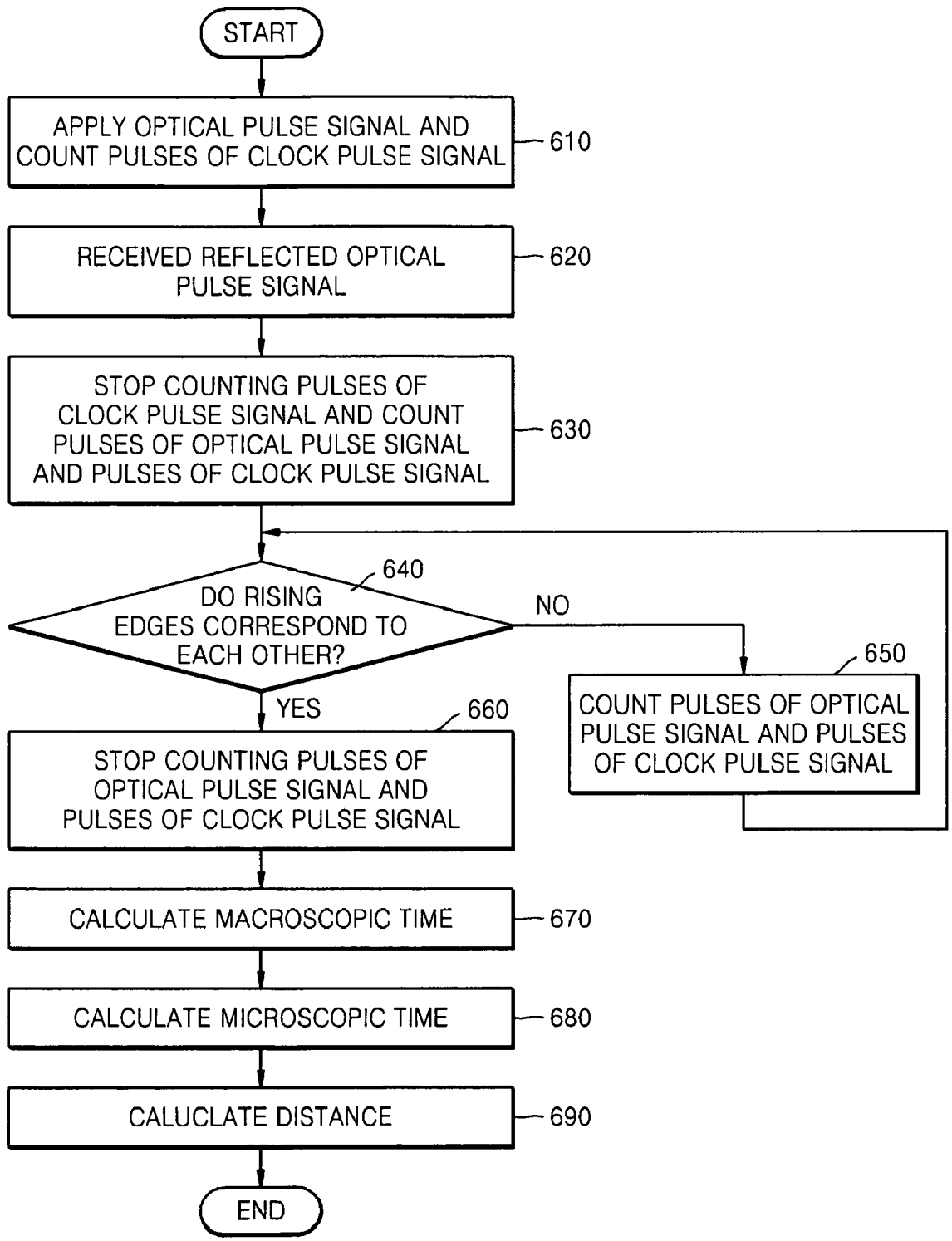
FIG. 6 is a flow chart of a distance measurement method according to an embodiment of the present invention.

FIG. 6 is a flow chart of a distance measurement method according to an embodiment of the present invention. Referring to FIG. 6, the distance measurement method according to the current embodiment of the present invention includes operations time-serially processed in the distance measurement apparatus illustrated in FIG. 1 so that the technical spirit of the distance measurement apparatus of FIG.1 is applied to the distance measuring method according to the current embodiment of the present invention.

Referring to FIG. 6, the distance measurement apparatus of FIG. 1 applies an optical pulse signal having a predetermined frequency to a target object and starts to count pulses of a clock pulse signal in operation 610. It is preferable that the difference between the frequency of the optical pulse signal and the frequency of the clock pulse signal is sufficiently smaller than the frequency of the clock pulse signal and one of the frequency of the optical pulse signal and the frequency of the clock pulse signal does not correspond to an integer multiple of the other.

The distance measurement apparatus receives the optical pulse signal reflected from the target object in operation 620. Here, the time when the optical pulse signal is received is referred to as a time 2 and a rising edge of a pulse of the clock pulse signal right before the time 2 is referred to as a time 1 for convenience of explanation.

Subsequently, the distance measurement apparatus stops counting pulses of the clock pulse signal and starts to count pulses of the received optical pulse signal and pulses of the clock pulse signal again in operation 630. Here, the number of pulses of the clock pulse signal counted before the optical pulse signal is received is referred to as n.

The distance measurement apparatus checks whether the clock pulse signal corresponds to the received optical pulse signal in operation 640. The distance measurement apparatus can check whether the clock pulse signal corresponds to the received optical pulse signal by determining whether a rising edge of a pulse of the clock pulse signal and a rising edge of a pulse of the optical pulse signal correspond to each other.

The distance measurement apparatus continuously counts pulses of the optical pulse signal and pulses of the clock pulse signal when the clock pulse signal does not correspond to the optical pulse signal in operation 650. When the clock pulse signal corresponds to the optical pulse signal in operation 640, the distance measurement apparatus stops counting pulses of the optical pulse signal and pulses of the clock pulse signal in operation 660. Here, the time when the counting operation is stopped is referred to as a time 3, and the number of pulses of the clock pulse signal and the number of pulses of the optical pulse signal, during the period from when the optical pulse signal is received to when the clock pulse signal corresponds to the optical clock signal, are respectively referred to as $n_s$ and $n_l$.

The distance measurement apparatus multiplies the number of pulses of the clock pulse signal, n, by the cycle of the clock pulse signal, S, to calculate the macroscopic time M corresponding to a period from when the optical pulse signal is applied to the target object to the time 1, as illustrated in FIG. 3A, in operation 670. This is represented as $M=n \times S$.

The distance measurement apparatus calculates the microscopic time R corresponding to a period from the time 1 to the time 2 using $n_s$ and $n_l$ in operation 680. Specifically, the microscopic time R corresponds to a difference between the period from the time 1 to the time 3 and a period from the time 2 to the time 3, as illustrated in FIG. 3B. The period from the time 1 to the time 3 equals the product of the number of pulses of the clock pulse signal, $n_s$, by the cycle of the clock pulse signal, S, and the period from the time 2 to the time 3 equals the product of the number of pulses of the optical pulse signal, $n_l$, by the cycle of the optical pulse signal, L. Accordingly, the microscopic time R corresponds to $R=(n_s \times S)-(n_l \times L)$.

The distance measurement apparatus adds up the macroscopic time M calculated in operation 670 and the microscopic time R calculated in operation 680 to calculate the round trip time of the optical pulse signal and calculates the distance D between the distance measurement apparatus and the target object using the equation $D=\frac{1}{2} \times c \times \{M+R\}=\frac{1}{2} \times c \times \{n \times S+(n_s \times S-n_l \times L)\}$ in operation 690.

Figure 7:
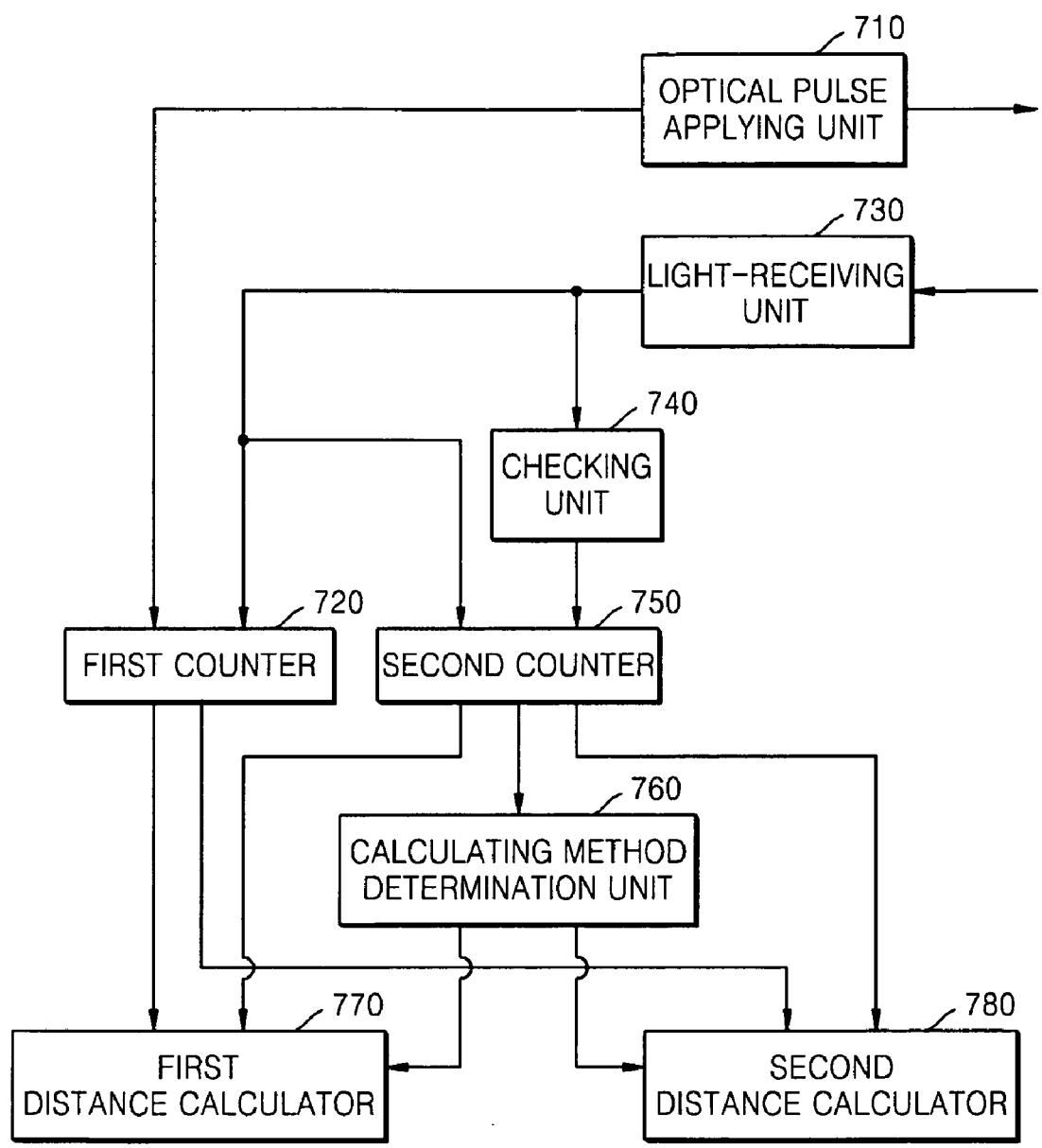
FIG. 7 is a block diagram of a distance measurement apparatus according to another embodiment of the present invention.

FIG. 7 is a block diagram of a distance measurement apparatus according to another embodiment of the present invention. Referring to FIG. 7, the distance measurement apparatus according to the current embodiment of the present invention includes an optical pulse signal applying unit 710, a first counter 720, a light-receiving unit 730, a checking unit 740, a second counter 750, a calculating method determination unit 760, a first distance calculator 770, and a second distance calculator 780. The first counter 720 and the second counter 750 can be embodied by using only one counter.

The optical pulse signal applying unit 710 applies an optical pulse signal to a target object at a rising edge of a pulse of a clock pulse signal. The first counter 720 counts pulses of the clock pulse signal from the time when the optical pulse signal is applied to the target object. When the light-receiving unit 730 receives the optical pulse signal reflected from the target object and charges are generated in pixels of the light-receiving unit 730, the first counter 720 stops counting the pulses of the clock pulse signal. Here, the number of counted pulses of the clock pulse signal from the time when the optical pulse signal is applied to the target object to when the light-receiving unit 730 receives the optical pulse signal is referred to as $P_M$.

The light-receiving unit 730 receives the optical pulse signal reflected from the target object. Here, the time when the optical pulse signal is received by the light-receiving unit 730 is referred to as a time 2 and a rising edge of a pulse of the clock pulse signal right before the time 2 is referred to as a time 1.

The checking unit 740 checks whether a rising edge of a pulse of the clock pulse signal and a rising edge of a pulse of the optical pulse signal received by the light-receiving unit 730 correspond to each other. Here, a time when the rising edges of the clock pulse signal and the optical pulse signal correspond to each other is referred to as a time 3. The checking unit 740 can check the amount of charges accumulated in the pixels of the light-receiving unit 730 and determine that a rising edge of a pulse of the clock pulse signal and a rising edge of a pulse of the optical pulse signal correspond to each other when the amount of accumulated charges reaches a peak value.

The second counter 750 counts pulses of the clock pulse signal at every rising edge of the clock pulse signal after the first counter 720 stops counting. The second counter 750 counts one more pulse at the time when the amount of charges accumulated in the pixels of the light-receiving unit 730 reaches the peak value and stops counting. This is because the checking unit 740 can detect the time when the amount of charges accumulated in the light-receiving unit 730 reaches the peak value when the second counter 750 counts pulses of the clock pulse signal until the amount of charges accumulated in the light-receiving unit 730 starts to decrease since the amount of charges accumulated in the light-receiving unit 730 continuously increases and then decreases and the amount of charges accumulated right before it decreases corresponds to the peak value. The counting result when the counting operation is stopped is referred to as $P_{mS}$.

To detect the time when the amount of charges accumulated in the light-receiving unit 730 reaches the peak value, the checking unit 740 waits for the second counter 750 to count one more pulse after the amount of charges accumulated in the light-receiving unit 730 reaches the peak value.

The calculating method determination unit 760 determines whether the counting result $P_{mS}$ is greater than half the number of division (referred to as a half value hereinafter), allows the first distance calculator 770 to calculate the distance between the distance measurement apparatus and the target object when $P_{mS}$ is greater than the half value, and allows the second distance calculator 780 to calculate the distance between the distance measurement apparatus and the target object when $P_{mS}$ is not greater than the half value.

The first distance calculator 770 calculates the distance between the distance measurement apparatus and the target object when $P_{mS}$ is greater than the half value. FIG. 8A illustrates the clock pulse signal and the optical pulse signal when $P_{mS}$ is greater than the half value.

Referring to FIGS. 7 and 8A, the first distance calculator 770 calculates a macroscopic time M using $P_M$ obtained by the first counter 720, calculates a microscopic time R that compensates the macroscopic time using $P_{mS}$ obtained by the second counter 750, adds up the macroscopic time M and the microscopic time R to obtain a round trip time of the optical pulse signal, multiplies the round trip time by the velocity of light, c, and divides the multiplication result by 2 to obtain the distance D between the distance measurement apparatus and the target object. Here, the multiplication result is divided by 2 because the time required for the optical pulse signal to arrive at the target object from the distance measurement apparatus corresponds to half the round trip time of the optical pulse signal. That is, the distance D between the distance measurement apparatus and the target object is calculated using $D=\frac{1}{2}\times c\times(M+R)$.

The first distance calculator 770 calculates the macroscopic time M using $M=(P_M-1)\times S$. The macroscopic time M corresponds to a period from when the optical pulse signal is applied to the target object to the time 1, and thus the macroscopic time M equals the product of the number of pulses of the clock pulse signal during the period from when the optical pulse signal is applied to the target object to the time 1 by the cycle of the clock pulse signal, S. The number of pulses of the clock pulse signal during the period from when the optical pulse signal is applied to the target object to the time 1 corresponds to a value obtained by subtracting one from $P_M$. This is because $P_M$ is greater than the number of pulses of the clock signal by one since $P_M$ is obtained at a rising edge of a pulse of the clock pulse signal.

The first distance calculator 770 calculates the microscopic time R using $R=(P_{mS}-1)\times S-(P_{mS}-2)\times L$. The microscopic time R corresponds to a difference between a period from the time 1 to time 3 and a period from the time 2 to the time 3, and the period from the time 1 to the time 3 equals the product of the number of pulses of the clock pulse signal by the cycle of the clock pulse signal, S, during the period time 1. The number of pulses of the clock pulse signal during the period from the time 1 to the time 3 corresponds to a value obtained by subtracting one from $P_{mS}$. This is because $P_{mS}$ is greater than the number of pulses of the clock signal by one since the second counter 750 counts one more pulse after the amount of charges accumulated in the pixels of the light-receiving unit 730 reaches the peak value. The period from the time 2 to the time 3 corresponds to the product of the number of pulses of the optical pulse signal during the period from the time 2 to the time 3 by the cycle of the optical pulse signal, L. The number of pulses of the optical pulse signal is smaller than the number of pulses of the clock pulse signal by one, and thus the number of pulses of the optical pulse signal equals $P_{mS}-2$. Accordingly, the first distance calculator 770 calculates the distance D between the distance measurement apparatus and the target object using the following equation.

$$D=\tfrac{1}{2}\times 3\times 10^8\times\{(P_M-1)\times S+(P_{mS}-1)\times S-(P_{mS}-2)\times L\}$$

The second distance calculator 780 calculates the distance D between the distance measurement apparatus and the target object when $P_{mS}$ is not greater than the half value. FIG. 8B illustrates the clock pulse signal and the optical pulse signal when $P_{mS}$ is not greater than the half value.

Referring to FIGS. 7 and 8B, the second distance calculator 780 calculates the macroscopic time M using $P_M$ obtained by the first counter 720, calculates the microscopic time R using $P_{mS}$ obtained by the second counter 750, adds up the macroscopic time M and the microscopic time R to obtain the round trip time of the optical pulse signal, multiplies the round trip time by the velocity of light, c, and divides the multiplication result by 2 to obtain the distance D between the distance measurement apparatus and the target object. The second distance calculator 780 calculates the macroscopic time M and the microscopic time R using a method different from the calculating method of the first distance calculator 770.

First of all, the second distance calculator 780 calculates the macroscopic time M using $M=(P_M-2)\times S$. The macroscopic time M corresponds to a period from when the optical pulse signal is applied to the target object to the time 1, and thus the macroscopic time M equals the product of the number of pulses of the clock pulse signal during the period from when the optical pulse signal is applied to the target object to the time 1 by the cycle of the clock pulse signal, S. The number of pulses of the clock pulse signal during the period from when the optical pulse signal is applied to the target object to the time 1 corresponds to a value obtained by subtracting 2 from $P_M$. This is because $P_M$ is a value counted until charges are generated in the pixels of the light-receiving 730 unit and thus $P_M$ is greater than the counting result at the time 1 by one, and $P_M$ is obtained at a rising edge of a pulse of the clock pulse signal and thus $P_M$ is greater than the number of pulses of the clock signal by one. Accordingly, the number of pulses of the clock pulse signal during the period from when the optical pulse signal is applied to the target object to the time 1 is obtained by subtracting 2 from $P_M$.

The second distance calculator 780 calculates the microscopic time R using $R=(P_{mS} \times S)-\{(P_{mS}-1) \times L\}$. The microscopic time R corresponds to a difference between a period from the time 1 to time 3 and a period from the time 2 to the time 3, and the period from the time 1 to the time 3 equals the product of the number of pulses of the clock pulse signal by the cycle of the clock pulse signal. S, during the period time 1. The number of pulses of the clock pulse signal during the period from the time 1 to the time 3 corresponds to $P_{mS}$. This is because $P_{mS}$ is obtained after one pulse from the time 1, and thus one is added to $P_{mS}$. Furthermore, the second counter 750 counts one more pulse after the amount of charges accumulated in the pixels of the light-receiving unit 730 reaches the peak value, and thus $P_{mS}$ is greater than the number of pulses of the clock pulse signal by one. Accordingly, the number of pulses of the clock pulse signal during the period from the time 1 to the time 3 corresponds to a value obtained by adding one to $P_{mS}$ and then subtracting the addition result, that is, $P_{mS}$.

The period from the time 2 to the time 3 corresponds to the product of the number of pulses of the optical pulse signal during the period from the time 2 to the time 3 by the cycle of the optical pulse signal, L. The number of pulses of the optical pulse signal is smaller than the number of pulses of the clock pulse signal by one, and thus the number of pulses of the optical pulse signal equals $P_{mS}-1$. Accordingly, the second distance calculator 780 calculates the distance D between the distance measurement apparatus and the target object using the following equation.

$$D = \frac{1}{2} \times 3 \times 10^8 \times \{(P_M-2) \times S + (P_{ms} \times S) - (P_{mS}-1) \times L\}$$

Figure 9:
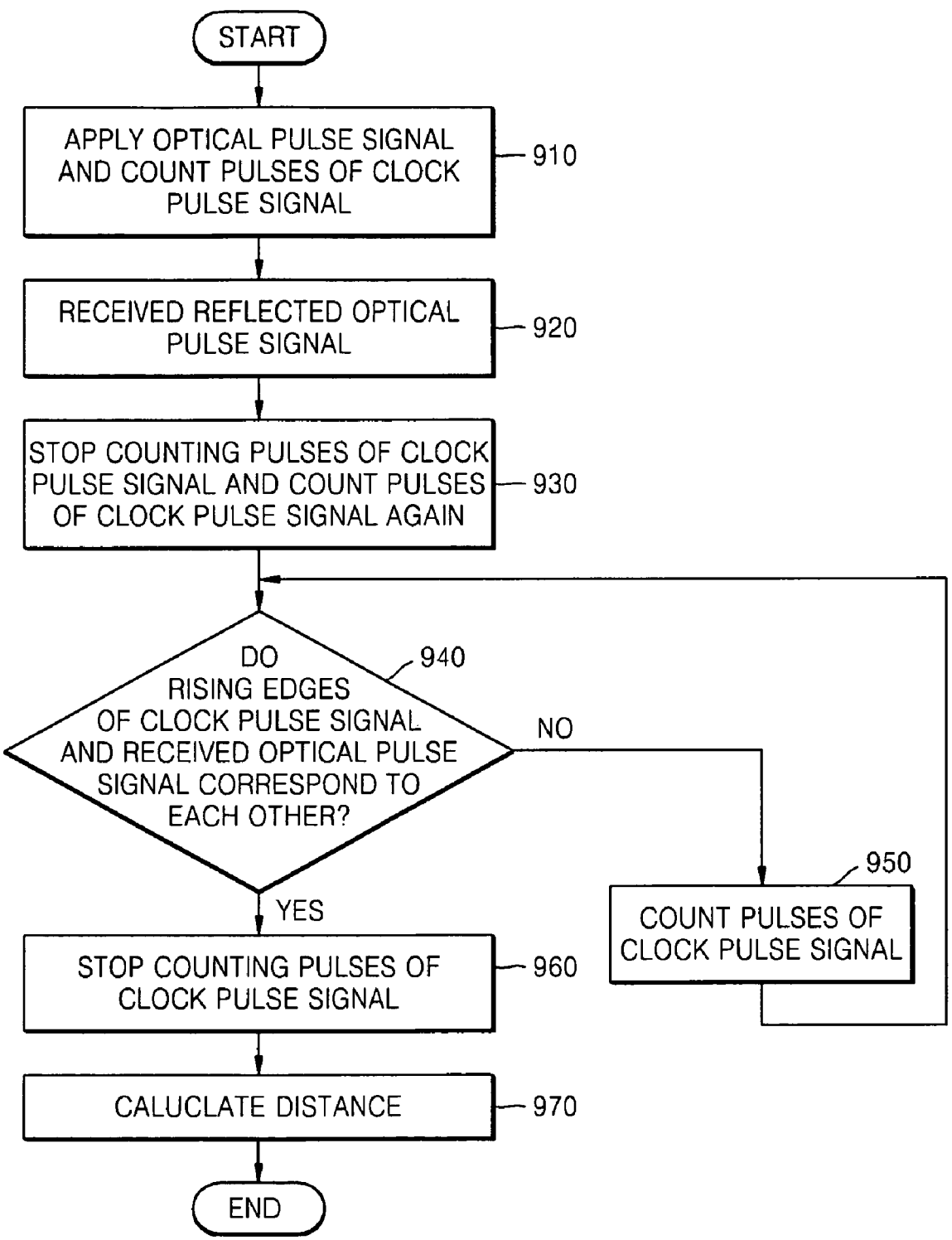
FIG. 9 is a flow chart of a distance measurement method according to another embodiment of the present invention.

FIG. 9 is a flow chart of a distance measurement method according to another embodiment of the present invention. The distance measurement method according to the current embodiment of the present invention includes operations time-serially processed in the distance measurement apparatus illustrated in FIG. 7 so that the technical spirit of the distance measurement apparatus of FIG. 7 can be applied to the distance measuring method according to the current embodiment of the present invention.

Referring to FIG. 9, the distance measurement apparatus of FIG. 7 applies an optical pulse signal to a target object at a rising edge of a pulse of a clock pulse signal in operation 910 and counts pulses of the clock pulse signal at every rising edge of the clock pulse signal. A gate is formed in each of a plurality of pixels receiving light in a sensor of the distance measurement apparatus, the gate is opened to pass the received light when a clock pulse signal applied to the sensor is high, and the gate is closed to block the received light when the clock pulse signal applied to the sensor is low. The gate is formed in order to make a time when the amount of charges accumulated in pixels reaches a peak value correspond to a time when the optical pulse signal and the clock pulse signal correspond to each other, as described above with reference to FIG. 2.

The distance measurement apparatus receives the optical pulse signal reflected from the target object in operation 920. The optical pulse signal is applied to the target object by the distance measurement apparatus, reflected from the target object and returned to the distance measurement apparatus, and thus the distance measurement apparatus receives the optical pulse signal after a lapse of time according to the distance between the distance measurement apparatus and the target object. Here, the time when the optical pulse signal is received is referred to as a time 2 and a rising edge of a pulse of the clock pulse signal right before the time 2 is referred to as a time 1.

Subsequently, the distance measurement apparatus stops counting pulses of the clock pulse signal when the optical pulse signal is received and charges are generated in the pixels of the sensor, in operation 930. Here, the number of counted pulses of the clock pulse signal when the counting operation is stopped is referred to as $P_M$. Then, the distance measurement apparatus counts pulses of the clock pulse signal at every rising edge of the clock pulse signal again.

In operation 940, the distance measurement apparatus checks whether a rising edge of a pulse of the clock pulse signal corresponds to a rising edge of a pulse of the received optical pulse signal using the property that the amount of charges generated in the pixels reaches a peak value when rising edges of the clock pulse signal and the optical pulse signal correspond to each other, as described above with reference FIG. 2.

The distance measurement apparatus counts pulses of the clock pulse signal at every rising edge of the clock pulse signal when a rising edge of a pulse of the clock pulse signal and a rising edge of a pulse of the optical pulse signal do not correspond to each other, in operation 950.

The distance measurement apparatus stops counting pulses of the clock pulse signal when a rising edge of a pulse of the clock pulse signal and a rising edge of a pulse of the optical pulse signal correspond to each other in operation 960. Here, the number of counted pulses of the clock pulse signal when the counting operation is stopped is referred to as $P_{mS}$ and a time when a rising edge of a pulse of the clock pulse signal corresponds to a rising edge of a pulse of the optical pulse signal, that is, the time when the counting operation is stopped, is referred to as a time 3.

The distance measurement apparatus calculates a macroscopic time M using $P_M$ obtained in operation 930, calculates a microscopic time R which compensates the macroscopic time M using $P_{mS}$ obtained in operation 960, and adds up the macroscopic time M and the microscopic time R to obtain a round trip time of the optical pulse signal. Then, the distance measurement apparatus multiplies the round trip time by the velocity of light, c, and divides the multiplication result by 2 to calculate the distance D between the distance measurement apparatus and the target object. Here, the multiplication result is divided by 2 because the time required for the optical pulse signal to arrive at the target object from the distance measurement apparatus corresponds to half the round trip time of the optical pulse signal (referred to as a half value). That is, the distance D between the distance measurement apparatus and the target object is calculated using $D = \frac{1}{2} \times c \times (M+R)$. The macroscopic time M and the microscopic time R should be calculated using different methods when $P_{mS}$ is greater than the half value and when $P_{mS}$ is smaller than the half value.

First, methods of calculating the macroscopic time M and the microscopic time R when $P_{mS}$ is greater than the half are explained.

The macroscopic time M corresponds to a period from when the optical pulse signal is applied to the target object to the time 1, and thus the macroscopic time M equals the product of the number of pulses of the clock pulse signal during the period from when the optical pulse signal is applied to the target object to the time 1 by the cycle of the clock pulse signal, S. The number of pulses of the clock pulse signal during the period from when the optical pulse signal is applied to the target object to the time 1 corresponds to a value obtained by subtracting one from $P_M$ obtained in operation 930. This is because $P_M$ is greater than the number of pulses of the clock signal by one since $P_M$ is obtained at a rising edge of a pulse of the clock pulse signal. Accordingly, the macroscopic time M can be calculated using the following equation.

$$M=(P_M-1)\times S$$

The microscopic time R corresponds to a difference between a period from the time 1 to time 3 and a period from the time 2 to the time 3, and the period from the time 1 to the time 3 equals the product of the number of pulses of the clock pulse signal during this period by the cycle of the clock pulse signal, S. The number of pulses of the clock pulse signal during the period from the time 1 to the time 3 corresponds to a value obtained by subtracting one from $P_{mS}$.

The period from the time 2 to the time 3 corresponds to the product of the number of pulses of the optical pulse signal during the period from the time 2 to the time 3 by the cycle of the optical pulse signal, L. The number of pulses of the optical pulse signal is smaller than the number of pulses of the clock pulse signal by one, and thus the number of pulses of the optical pulse signal equals $P_{mS}-2$. Accordingly, the microscopic time R corresponding to the difference between the period from time 1 to the time 3 and the period from the time 2 to the time 3 is represented as $R=(P_{mS}-1)\times S-(P_{mS}-2)\times L$ Therefore, the distance D between the distance measurement apparatus and the target object can be calculated using the following equation in operation 970.

$$D=\tfrac{1}{2}\times 3\times 10^8\times\{(P_{mS}-1)\times S+(P_{mS}-1)\times S-(P_{mS}-2)\times L\}$$

Methods of calculating the macroscopic time and the microscopic time R when $P_{mS}$ is not greater than the half value are now described as follows.

The macroscopic time M corresponds to the period from when the optical pulse signal is applied to the target object to the time 1, and thus the macroscopic time M equals the product of the number of pulses of the clock pulse signal during the period from when the optical pulse signal is applied to the target object to the time 1 by the cycle of the clock pulse signal, S. The number of pulses of the clock pulse signal during the period from when the optical pulse signal is applied to the target object to the time 1 corresponds to a value obtained by subtracting 2 from $P_M$. Accordingly, the macroscopic time M can be represented by the following equation.

$$M=(P_M-2)\times S.$$

The microscopic time R corresponds to the difference between the period from the time 1 to time 3 and the period from the time 2 to the time 3, and the period from the time 1 to the time 3 equals the product of the number of pulses of the clock pulse signal during this period by the cycle of the clock pulse signal, S. The number of pulses of the clock pulse signal during the period from the time 1 to the time 3 corresponds to $P_{mS}$ obtained in operation 960. In addition, the period from the time 2 to the time 3 corresponds to the product of the number of pulses of the optical pulse signal during the period from the time 2 to the time 3 by the cycle of the optical pulse signal, L. The number of pulses of the optical pulse signal is smaller than the number of pulses of the clock pulse signal by one, and thus the number of pulses of the optical pulse signal equals $P_{mS}-1$. Accordingly, the microscopic time R can be represented as follows.

$$R=(P_{mS}\times S)-(P_{mS}-1)\times L$$

Therefore, the distance D between the distance measurement apparatus and the target object can be calculated using the following equation in operation 970.

$$D=\tfrac{1}{2}\times 3\times 10^8\times\{(P_M-2)\times S+(P_{mS}\times S)-(P_{mS}-1)\times L\}$$

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code/instructions.

The computer readable code/instructions can be recorded/transferred on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), a CD-R (Recordable)/Rewritable, and DVD-R (Recordable/Rewritable). The media may also be a distributed network, so that the computer readable code/instructions is/are stored/transferred and executed in a distributed fashion. Still further, as only an example, the processing element could include a processor or a computer processor, and processing elements may be distributed and/or included in a single device.

For example, embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing embodiments may be recorded on computer-readable media comprising computer-readable recording media discussed above. The program/software implementing embodiments may also be transmitted over transmission communication media. An example of transmission communication media includes a carrier-wave signal.

Further, according to an aspect of embodiments, any combination of the described features, functions and/or operations can be implemented.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A distance measurement method comprising:
counting pulses of a second pulse signal for calculating a macroscopic time during a round trip time of a first pulse signal, from when the first pulse signal is applied to a target object by a distance measurement apparatus to when the first pulse signal reflected from the target object is received by the distance measurement apparatus;

counting pulses of the second pulse signal for calculating a microscopic time during a period from when the first pulse signal is received by the distance measurement apparatus to when the received first pulse signal and the second pulse signal correspond to each other; and calculating a distance between the distance measurement apparatus and the target object using the macroscopic time and the microscopic time based on the counting results.

2. The distance measurement method of claim 1, wherein the first pulse signal comprises an optical pulse signal having a predetermined frequency.

3. The distance measurement method of claim 1, wherein one of the frequency of the first pulse signal and the frequency of the second pulse signal does not correspond to an integer multiple of the other.

4. The distance measurement method of claim 1, wherein the calculating of the distance between the distance measurement apparatus and the target object comprises:

calculating the round trip time of the first pulse signal using the counted number of pulses of the second pulse signal; and calculating the distance using the calculated round trip time and the velocity of light.

5. The distance measurement method of claim 4, wherein the calculating of the round trip time comprises:

calculating the macroscopic time in the round trip time using the number of pulses of the second pulse signal counted during the period from when the first pulse signal is applied to the target object by the distance measurement apparatus to when the first pulse signal reflected from the target object is received by the distance measurement apparatus;

calculating the microscopic time in the round trip time using the number of pulses of the second pulse signal counted during the period from when the first pulse signal is received by the distance measurement apparatus to when the received first pulse signal and the second pulse signal correspond to each other; and adding up the macroscopic time and the microscopic time to calculate the round trip time.

6. The distance measurement method of claim 1, wherein the received first pulse signal and the second pulse signal correspond to each other when amount of charges accumulated in pixels which receive the first pulse signal reflected from the target object reaches a peak value.

7. A computer readable recording medium storing a program for executing the distance measurement method of claim 1.

8. A distance measurement apparatus comprising:

a first counter to count pulses of a second pulse signal for calculating a macroscopic time during a period from when a first pulse signal is applied to a target object by the distance measurement apparatus to when the first pulse signal reflected from the target object is received by the distance measurement apparatus;

a second counter to count pulses of the second pulse signal for calculating a microscopic time during a period from when the first pulse signal is received by the distance measurement apparatus to when the received first pulse signal and the second pulse signal correspond to each other; and a distance calculator to calculate a distance between the distance measurement apparatus and the target object using the macroscopic time and the microscopic time based on the counting results of the first and second counters.

9. The distance measurement apparatus of claim 8, wherein the first pulse signal comprises an optical pulse signal having a predetermined frequency.

10. The distance measurement apparatus of claim 8, wherein one of the frequency of the first pulse signal and the frequency of the second pulse signal does not correspond to an integer multiple of the other.

11. The distance measurement apparatus of claim 8, wherein the distance calculator comprises:

a macroscopic time calculating module to calculate the macroscopic time using the number of pulses of the second pulse signal counted during the period from when the first pulse signal is applied to the target object by the distance measurement apparatus to when the first pulse signal reflected from the target object is received by the distance measurement apparatus;

a microscopic time calculating module to calculate the microscopic time using the number of pulses of the second pulse signal counted during the period from when the first pulse signal is received by the distance measurement apparatus to when the received first pulse signal and the second pulse signal correspond to each other; and a distance calculating module to calculate the distance using the macroscopic time and the microscopic time.

12. The distance measurement apparatus of claim 8, wherein the received first pulse signal and the second pulse signal correspond to each other when the amount of charges accumulated in pixels which receive the first pulse signal reflected from the target object reaches a peak value.

* * * * *